United States Patent
Sa et al.

(10) Patent No.: US 12,318,766 B2
(45) Date of Patent: Jun. 3, 2025

(54) METHOD FOR PREPARING COCATALYST COMPOUND USING ANHYDROUS HYDROCARBON SOLVENT

(71) Applicant: LG Chem, Ltd., Seoul (KR)

(72) Inventors: Seok Pil Sa, Daejeon (KR); Eun Ji Shin, Daejeon (KR); Ki Soo Lee, Daejeon (KR); Bun Yeoul Lee, Gyeonggi-do (KR); Jun Won Baek, Incheon (KR); Hyun Ju Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 758 days.

(21) Appl. No.: 17/414,143

(22) PCT Filed: May 14, 2020

(86) PCT No.: PCT/KR2020/006373
§ 371 (c)(1),
(2) Date: Jun. 15, 2021

(87) PCT Pub. No.: WO2020/235868
PCT Pub. Date: Nov. 26, 2020

(65) Prior Publication Data
US 2022/0062879 A1    Mar. 3, 2022

(30) Foreign Application Priority Data
May 17, 2019    (KR) .................. 10-2019-0058294

(51) Int. Cl.
*B01J 31/00*    (2006.01)
*B01J 31/14*    (2006.01)
*B01J 31/18*    (2006.01)
*C08F 10/02*    (2006.01)

(52) U.S. Cl.
CPC ......... *B01J 31/146* (2013.01); *B01J 31/1815* (2013.01); *C08F 10/02* (2013.01); *B01J 2531/49* (2013.01)

(58) Field of Classification Search
None
See application file for complete search history.

(56) References Cited

U.S. PATENT DOCUMENTS

| | | | |
|---|---|---|---|
| 5,919,983 A | 7/1999 | Rosen et al. | |
| 6,121,185 A | 9/2000 | Rosen et al. | |
| 6,162,950 A * | 12/2000 | Lee | C07F 5/027 568/1 |
| 6,462,156 B2 | 10/2002 | LaPointe | |
| 2001/0027161 A1 | 10/2001 | LaPointe | |
| 2002/0132729 A1 | 9/2002 | LaPointe | |
| 2006/0183631 A1 | 8/2006 | Lee et al. | |
| 2011/0105705 A1 | 5/2011 | Han et al. | |
| 2012/0316303 A1 | 12/2012 | Hanton et al. | |
| 2013/0253155 A1 | 9/2013 | Luo | |
| 2014/0309387 A1 | 10/2014 | Kim et al. | |
| 2016/0207850 A1 | 7/2016 | Shin et al. | |
| 2017/0233415 A1 | 8/2017 | Joung et al. | |
| 2017/0369605 A1* | 12/2017 | Joung | C08F 4/64 |

FOREIGN PATENT DOCUMENTS

| | | |
|---|---|---|
| CN | 1290267 A | 4/2001 |
| CN | 103717303 A | 4/2014 |
| CN | 105683135 A | 6/2016 |
| CN | 106573941 A | 4/2017 |
| CN | 107001394 A | 8/2017 |
| JP | 2000507157 A | 6/2000 |
| JP | 2004500359 A | 1/2004 |
| JP | 2012036218 A | 2/2012 |
| KR | 20000005028 A | 1/2000 |
| KR | 100753477 B1 | 8/2007 |
| KR | 100753478 B1 | 8/2007 |
| KR | 20110078840 A | 7/2011 |
| KR | 20120098711 A | 9/2012 |
| KR | 101271055 B1 | 6/2013 |
| KR | 20130132435 A | 12/2013 |
| KR | 20160073823 A | 6/2016 |
| KR | 101738827 B1 | 5/2017 |
| KR | 20170105789 A | 9/2017 |
| KR | 101797890 B1 | 11/2017 |
| KR | 20180012908 A | 2/2018 |
| WO | 0142249 A1 | 6/2001 |
| WO | 2006080817 A1 | 8/2006 |

OTHER PUBLICATIONS

International Search Report for Application No. PCT/KR2020/006373, mailed Jul. 14, 2020, 2 pages.
Walter Kaminsky, Discovery of Methylaluminoxane as Cocatalyst for Olefin Polymerization, Macromolecules, published online Mar. 2012, pp. 3289-3297, vol. 45, No. 8, ACS Publications.
Pellecchia C et al: "Group 4 Transition Metal Complex Cations for Olefin Polymerization", Makromolekulare Chemie, Rapid Communications, vol. 12, Dec. 1, 1991 (Dec. 1, 1991), pp. 663-667, XP000244212.
Extended European Search Report for Application No. 20808950.8 dated Feb. 23, 2022. 8 pgs.

* cited by examiner

*Primary Examiner* — Yun Qian
(74) *Attorney, Agent, or Firm* — Lerner David LLP

(57) ABSTRACT

The present invention relates to a method for preparing a cocatalyst compound using an anhydrous hydrocarbon solvent, and a cocatalyst compound prepared thereby.

5 Claims, 2 Drawing Sheets

METHOD FOR PREPARING COCATALYST COMPOUND USING ANHYDROUS HYDROCARBON SOLVENT

CROSS-REFERENCE TO RELATED APPLICATIONS

The present application claims the benefit of priority based on Korean Patent Application No. 10-2019-0058294, filed on May 17, 2019, the entire contents of which are incorporated herein by reference.

TECHNICAL FIELD

Technical Field

The present invention relates to a method for preparing a cocatalyst compound using an anhydrous hydrocarbon solvent, and a cocatalyst compound prepared thereby.

Background Art

Polyolefin (PO) is a polymer prepared mainly using a Ziegler-Natta catalyst. The conventional heterogeneous multi-site Ziegler-Natta catalysts frequently used for preparing polyolefin have been replaced with homogeneous single-site catalysts. The use of the homogeneous single-site catalysts started with the accidental discovery of methylaluminoxane (MAO) by Kaminski, and at the beginning, Zr-based metallocene catalysts, Ti-based half-metallocenes and post-metallocene catalysts having a non-cyclopentadienyl ligand have been developed.

The Ti-based half-metallocenes have characteristics showing higher alpha-olefin mixing capacity in ethylene/alpha-olefin copolymerization reaction for commercially producing polyolefin elastomer, when compared with the Zr-based metallocene catalysts, and the typical examples thereof include [Me$_2$Si($\eta^5$-Me$_4$C$_5$)N$^t$Bu]TiCl$_2$ (Constrained-Geometry Catalyst, CGC) developed by Dow Co. in the early 1990s. As the diverse characteristics of CGC become gradually known, efforts to synthesize the derivatives thereof and utilize thereof as a polymerization catalyst have been actively conducted in academia and industrial world. The method of approach may include the modification of a support ligand, the introduction of other various bridges and nitrogen substituents instead of silicon bridges, the introduction of an oxido ligand instead of the amido ligand of CGC, etc.

In addition, as typical metal compounds well-known until now, silicon bridges of a CGC structure, phosphorous, ethylene or propylene, methylidene and methylene bridges, etc., have been introduced. However, if applied to ethylene polymerization or the copolymerization of ethylene and alpha olefin, excellent results in terms of a polymerization activation degree or copolymerization performance were not shown when compared with CGC.

Meanwhile, such compounds need a step of activation using a cocatalyst, and through this, the activity as the catalyst of polymerization reaction may be shown. Organic borate-based compounds, etc. may be used as the cocatalyst, and if the cocatalyst is prepared by the conventional preparation method, water is used during a preparation process, and moisture may remain in the cocatalyst, and this may inhibit the activity of a metal complex which is weak to water while acting as an activating agent after reacting with a transition metal compound, and the performance as a catalyst may be degraded.

Accordingly, the development of a method for preparing a cocatalyst compound which may not inhibit the catalyst activity of a transition metal compound is still required.

PRIOR ART DOCUMENT

Patent Document

Korean Registration Patent No. 10-1271055

DISCLOSURE OF THE INVENTION

Technical Problem

An object of the present invention is to provide a novel preparation method for preparing a cocatalyst compound represented by Formula 1 using an anhydrous hydrocarbon solvent.

Another object of the present invention is to provide a cocatalyst compound prepared by the preparation method and a catalyst composition including the same.

Technical Solution

The present invention provides a method for preparing a compound represented by the following Formula 1, including a step of reacting a compound represented by the following Formula 2 and a compound represented by the following Formula 3 in the presence of an anhydrous hydrocarbon solvent:

  [Formula 1]

  [Formula 2]

  [Formula 3]

where
L is a Lewis base containing nitrogen, sulfur or phosphorous,
Z is an element in group 13,
each A is independently aryl of 6 to 20 carbon atoms or alkyl of 1 to 20 carbon atoms, where one or more hydrogen atoms may be substituted with substituents,
the substituent of A is halogen, hydrocarbyl of 1 to 20 carbon atoms, alkoxy of 1 to 20 carbon atoms, or aryloxy of 6 to 20 carbon atoms,
M is a metal in group 1, and
X is a halogen element.

Advantageous Effects

If a cocatalyst is prepared according to the preparation method of the present invention, and the cocatalyst is used in the activation reaction of a main catalyst compound, the catalyst activity of the main catalyst compound, particularly, a hafnium compound may be effectively increased, and further, the polymerization reaction of a monomer may be efficiently performed.

In addition, to secure technical competitiveness and cost price competitiveness in a commercialization process, the activity of a catalyst is required to be high, the amount used of the catalyst is required to decrease, the reproducibility of a catalyst product is required to be excellent, and stability is required to be secured. A catalyst composition having markedly improved activity, reproducibility and stability may be prepared by using the cocatalyst prepared according to the preparation method of the present invention.

BEST NODE FOR CARRYING OUT THE INVENTION

Figure 1:
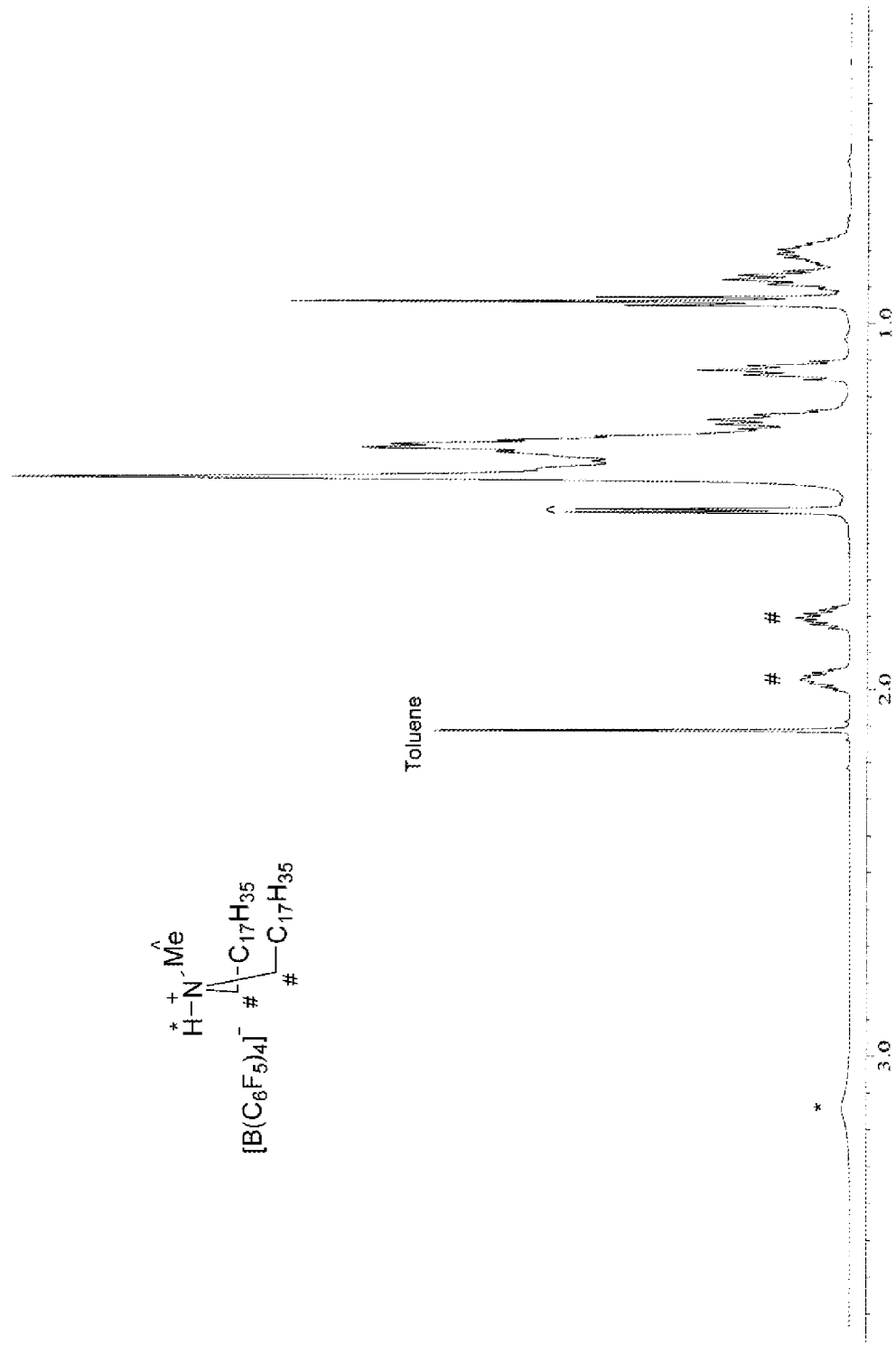
FIG. 1 shows a $^1$H NMR spectrum of anhydrous $[(C_{18}H_{37})_2N(H)Me]^+[B(C_6F_5)_4]^-$ which is a cocatalyst prepared according to the present invention.

Hereinafter, the present invention will be explained in more detail to assist the understanding of the present invention.

It will be understood that words or terms used in the description and claims of the description shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

In the conventional method of synthesizing a cocatalyst, a reactant having low solubility in an organic solvent (for example, $[K][B(C_6F_5)]$) was used, and by-products having low solubility in the organic solvent (for example, KCl) were produced during a separation process. Accordingly, water was essentially used in synthetic and separating processes. In such a method, though water was removed after preparing the cocatalyst in high temperature/low pressure conditions, a certain amount or more moisture remained inevitably in the cocatalyst, and the moisture acted as a catalyst poison which degraded catalyst activity through the reaction with a catalyst compound. Particularly, if a cocatalyst including an element in group 13 such as boron was prepared as above, and moisture remained in the cocatalyst, defects of degrading the catalyst activity through the reaction with a main catalyst which was weak to moisture were remarkably shown.

To solve such defects, in the present invention, a cocatalyst is prepared using an anhydrous hydrocarbon solvent in the whole process for synthesizing and separating the cocatalyst so that water does not remain in the cocatalyst, and the cocatalyst of the present invention thus prepared contains no moisture at all, efficiently reacts with a small amount of a main catalyst to show excellent catalyst activity, and shows markedly improved results on catalyst stability.

Particularly, the present invention provides a method of preparing a compound represented by Formula 1 which is a cocatalyst, characterized in including a step of reacting a compound represented by the following Formula 2 and a compound represented by the following Formula 3 in the presence of an anhydrous hydrocarbon solvent:

  [Formula 1]

  [Formula 2]

  [Formula 3]

where

L is a Lewis base containing nitrogen, sulfur or phosphorous,

Z is an element in group 13, each A is independently aryl of 6 to 20 carbon atoms or alkyl of 1 to 20 carbon atoms, where one or more hydrogen atoms may be substituted with substituents, the substituent of A is halogen, hydrocarbyl of 1 to 20 carbon atoms, alkoxy of 1 to 20 carbon atoms, or aryloxy of 6 to 20 carbon atoms, M is a metal in group 1, and X is a halogen element.

Particularly, in view of solving the defects of the related arts and improving the activity as a cocatalyst by using an anhydrous hydrocarbon solvent, Z may preferably be boron.

In addition, in the above formulae, L is a Lewis base containing nitrogen, Z is boron, and each A may be independently aryl of 6 to 20 carbon atoms, where one or more hydrogen atoms may be substituted with substituents, and the substituent of A may be halogen or hydrocarbyl of 1 to 20 carbon atoms.

For example, $[Z(A)_4]^-$ included in Formula 1 or 2 may be one or more selected from the group consisting of tetrakis(phenyl)borate, tetrakis(pentafluorophenyl)borate, tetrakis[3,5-bis(trifluoromethyl)phenyl]borate and derivatives thereof, without limitation.

The compound represented by Formula 1, prepared by the preparation method of the present invention shows at least two peaks in a range of 1.60 ppm to 2.10 ppm in a 1H NMR (500 MHz, $C_6D_6$, and standard material TMS) spectrum, and more particularly, at least one peak in each of a range of 1.75 ppm to 1.90 ppm and in a range of 1.90 ppm to 2.00 ppm.

Particularly, in the present invention, water is prevented from being included in a preparation process by using an anhydrous hydrocarbon solvent as described above, and the compound represented by Formula 1, thus prepared shows at least one peak in each of a range of 1.75 ppm to 1.90 ppm and in a range of 1.90 ppm to 2.00 ppm, in a $^1$H NMR spectrum. Protons attached to α-carbon adjacent to nitrogen, sulfur or phosphorous included in L show different peaks. For example, if the compound represented by Formula 1 is $[(C_{18}H_{37})_2N(H)Me]^+[B(C_6F_5)_4]^-$, in the $^1$H NMR spectrum, two protons present in $NCH_2$ show individual peaks. This is shown because water molecules are not coordinated in the cocatalyst prepared by the preparation method of the present invention, and clear two peaks are shown, and the peaks are intrinsic peaks shown because the cocatalyst of the present invention does not contain moisture.

On the contrary, in the cocatalyst prepared by the preparation method of the related arts, since remaining water molecules are coordinated in $NCH_2$, only a wide single peak is shown in a range of 1.75 ppm to 2.00 ppm but different peaks are not shown in a range of 1.75 ppm to 1.90 ppm and 1.90 ppm to 2.00 ppm, if measuring $^1$H NMR spectrum by the same conditions.

In the present invention, examples of the compound represented by Formula 1, prepared by the preparation method may be, if Z is boron, for example, dioctadecylmethylammonium tetrakis(pentafluorophenyl)borate $[(C_{18}H_{37})_2N(H)Me]^+[B(C_6F_5)_4]^-$, dioctadecylmethylammonium tetrakis(phenyl)borate, dioctadecylmethylammonium tetrakis[3,5-bis(trifluoromethyl)phenyl]borate tetrakis(phenyl)borate, triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, trimethylammonium tetraphenylborate, tripropylammonium tetraphenylborate, trimethylammonium tetra(p-tolyl)borate, tripropylammonium tetra(p-tolyl)borate, triethylammonium tetra(o,p-dimethylphenyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetraphenylborate, N,N-diethylanilinium tetrapentafluorophenylborate, diethylammonium tetrapentafluorophenylborate, triphenylphosphonium tetraphenylborate, triphenylcarbonium tetra(p-trifluoromethylphenyl)borate, triphenylcarbonium tetrapentafluorophenylborate, or combinations thereof, and if Z is aluminum, for example, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetraphenylaluminum, N,N-diethylanilinium tetrapentafluorophenylaluminum, diethylammonium tetrapentatetraphenylaluminum, triphenylphosphonium tetraphenylaluminum, trimethylphosphonium tetraphenylaluminum, triethylammonium tetraphenylaluminum, tributylammonium tetraphenylaluminum, or combinations thereof, without limitation.

In the present invention, the hydrocarbon solvent may use one or more selected from the group consisting of butane, pentane, neopentane, hexane, cyclohexane, methylcyclohexane, heptane, octane, benzene, toluene, xylene, ethylbenzene, dichloromethane and chloroform, but is not limited thereto, and all hydrocarbon solvents used in this technical field may be used in anhydrous forms.

In the present invention, the reaction of the compound represented by Formula 2 and the compound represented by Formula 3 may be performed at a temperature of 0 to 50° C., preferably, at a temperature of 10 to 40° C., or at a temperature of 15 to 30° C.

In addition, the reaction may be performed for 15 minutes to 5 hours, or 30 minutes to 3 hours, or 30 minutes to 1 hour.

In addition, the molar ratio of the compound represented by Formula 2 and the compound represented by Formula 3 in the reaction may be 1:1 to 5:1, or 1:1 to 2:1.

In addition, the present invention provides the compound represented by Formula 1, prepared by the preparation method. As described above, the compound represented by Formula 1, prepared in the present invention shows an intrinsic peak in a $^1$H-NMR spectrum, and shows, when activating a catalyst for polymerizing olefin, high catalyst activity and catalyst stability.

The compound represented by Formula 1 of the present invention is a cocatalyst compound and may be used as a cocatalyst composition including the same. The "composition" includes a mixture of materials including the corresponding composition as well as a reaction product and decomposition product formed from materials of the corresponding composition.

The cocatalyst composition, in addition to the compound represented by Formula 1 of the present invention, may further include a cocatalyst commonly used in this technical field, and may particularly further include one or more selected among the following Formulae 4 and 5:

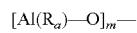 [Formula 4]

 [Formula 5]

where
each $R_a$ is independently a halogen radical, a hydrocarbyl radical of 1 to 20 carbon atoms, or a halogen-substituted hydrocarbyl radical of 1 to 20 carbon atoms,
m is an integer of 2 or more, and
D is aluminum or boron.

The compound represented by Formula 4 is not specifically limited as long as alkylaluminoxane is used. Preferable examples thereof may include methylaluminoxane, ethylaluminoxane, isobutylaluminoxane, butylaluminoxane, etc., more preferably, methylaluminoxane.

The compound represented by Formula 5 is not specifically limited, and preferable examples thereof may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and more preferably, selected from trimethylaluminum, triethylaluminum, and triisobutylaluminum.

The cocatalyst composition may be used as a catalyst activator of a transition metal compound, and the transition metal compound and the cocatalyst composition may be used in a supported type by a support. Silica or alumina may be used as the support.

In the present invention, the cocatalyst composition may be used in a catalyst composition including an organometallic compound as a main catalyst.

As the organometallic compound used as the main catalyst in the catalyst composition, all organometallic catalyst may be used as long as a central metal is Ti, Hf, or Zr, and a structure is metallocene, half-metallocene or post-metallocene, without limitation.

The interaction of the compound represented by Formula 1, included in the catalyst composition with a main catalyst is smooth, and the organometallic compound which is the main catalyst is activated to effectively achieve catalyst activity, and accordingly, the efficiency of the polymerization reaction of an olefin monomer may be improved.

The catalyst composition may be prepared through the step of contacting the compound represented by Formula 1 of the present invention and an organometallic compound.

The molar ratio of the compound represented by Formula 1 and the organometallic compound may be 1:0.05 to 1:2, particularly, 1:0.1 to 1:1, or 1:0.2 to 1:1. If the amount of the compound represented by Formula 1 is less than the above range, the amount of the cocatalyst is relatively smaller than the main catalyst, and the activation of a metallocene compound may be incompletely achieved to generate the defect of degrading the activity of the catalyst composition, and if the amount of the compound represented by Formula 1 is greater than the above range, the activation of a metallocene compound may be completely achieved, but due to remaining excessive amount of the cocatalyst, defects on uneconomical unit cost of the catalyst composition and the deterioration of the purity of a polymer may arise.

As the reaction solvent used during the preparation of the composition, a hydrocarbon-based solvent such as pentane, hexane, and heptanes, and an aromatic solvent such as benzene and toluene may be used, but is not limited thereto, and all solvents used in this technical field may be used.

In addition, the compound represented by Formula 1 and the organometallic compound may be used in a supported type in a support. As the support, silica or alumina may be used.

In addition, the present invention provides a preparation method of an olefin polymer, including a step of polymerizing an olefin monomer in the presence of the catalyst composition.

The most preferable preparation process using the catalyst composition is a solution process, and if the composition is used together with an inorganic support such as silica, a slurry process or a gas phase process may also be applied.

The catalyst composition for activation may be injected after being dissolved or diluted in an aliphatic hydrocarbon solvent of 5 to 12 carbon atoms such as pentane, hexane, heptane, nonane, decane, isomers thereof, an aromatic hydrocarbon solvent such as toluene and benzene, or a hydrocarbon solvent substituted with a chlorine atom such as dichloromethane and chlorobenzene, which are suitable for an olefin polymerization process. The solvent used may preferably be used after removing a small amount of water or air, which functions as a catalyst poison, by treating with a small amount of alkylaluminum, and may be used by further using a cocatalyst.

In the present invention, the olefin monomer may be one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene and 1-eicosene, without limitation.

Particularly, the olefin polymer may be an olefin homopolymer, an olefin/alpha-olefin copolymer, preferably, an ethylene/alpha-olefin copolymer according to the type of the olefin monomer. In this case, the amount of the alpha-olefin monomer, which is a comonomer, may be suitably selected according to the use, purpose, etc., of the olefin polymer by a person skilled in the art, and may be about 1 to 99 mol %.

EXAMPLES

Hereinafter, the present invention will be explained more particularly referring to the examples. However, the examples are for illustrating the present invention, and the scope of the present invention is not limited thereto.

Reagents and Experimental Conditions

All experiments were performed under an inert atmosphere using a standard glove box and Schlenk technique. Toluene, hexane and THF were used after distilling from benzophenone ketyl. Methylcyclohexane (anhydrous grade) used in polymerization reaction was used after purchasing from Tokyo Chemical Industry (TCI) and separating using a Na/K alloy. HfCl$_4$ (sublimed-grade) was purchased from Streme and used as it was. An ethylene/propylene mixture gas was purified on trioctylaluminum (0.6 M in methylcyclohexane) in a bomb reactor (2.0 L).

$^1$H NMR (600 MHz) and $^{13}$C NMR (150 MHz) spectrums were measured using a JOEL ECZ 600 apparatus, and elemental analysis was performed at the Analysis Center of Ajou University. GPC data were obtained by 1,2,4-trichlorobenzene at 160° C. by using a PL-GPC 220 system equipped with an RI detector, and two columns (Varian, PLgel mixed-B 7.5 Y 300 mm).

Preparation of Cocatalyst

Preparation Example 1

An excessive amount of $[K]^+[B(C_6F_5)_4]^-$ (0.633 g, 0.881 mmol, pure water) and a solution of $[(C_{18}H_{37})_2N(H)Me]^+$ $[Cl]^-$ (0.404 g, 0.705 mmol) in toluene (anhydrous, 10 mL) were reacted in a glove box at 25° C. for 1 hour. After filtering on celite, solvents were removed using a vacuum line. The residue was dissolved in methylcyclohexane (4 mL) and then filtered again on celite. By removing the solvent, a yellow oily compound was produced and was used without additional separation (0.797 g, 93%). $^1$H NMR spectrum was analyzed, and the results are shown in FIG. 1.

Comparative Preparation Example 1

$K^+[B(C_6F_5)_4]^-$ (3 g, 4.177 mmol, pure water) and $[(C_{18}H_{37})_2N(H)Me]^+[Cl]^-$ (2.511 g, 4.386 mmol) were reacted in the presence of toluene (130 mL) and water (120 mL) at room temperature for 1 hour. 200 mL of a Na$_2$CO$_3$ saturated solution was added thereto, and an aqueous layer was removed from the mixture using a separating funnel. 100 mL of a Na$_2$CO$_3$ saturated solution was added and washed, and 100 mL of distilled water was added and additionally washed. MgSO$_4$ was injected to remove water, and the resultant product was filtered. The Solvent was removed from the filtrate using a rotary evaporator to obtain a yellow oily compound (4.16 g, 82%).

In the $^1$H NMR spectrum of Preparation Example 1, two protons bonded to α-carbon (NCH$_2$) were observed at 1.97 ppm and 1.80 ppm, respectively (FIG. 1).

$^1$H NMR (C$_6$D$_6$) δ 3.15 (br, H, NH), 1.97 (m, 2H, NCH$_2$), 1.80 (m, H, NCH$_2$), 1.51 (d, J=6.0 Hz, 3H, NCH$_3$), 1.45-1.29 (m, 48H), 1.26 (quintet, J=7.2 Hz, 4H), 1.13 (quintet, J=7.2 Hz, 4H), 0.94 (t, J=7.8 Hz, 6H), 0.88 (quintet, J=7.8 Hz, 4H), 0.81 (m, 4H) ppm. $^{19}$F NMR (C$_6$D$_6$): δ −132.09, −161.75, −165.98.

Figure 2:
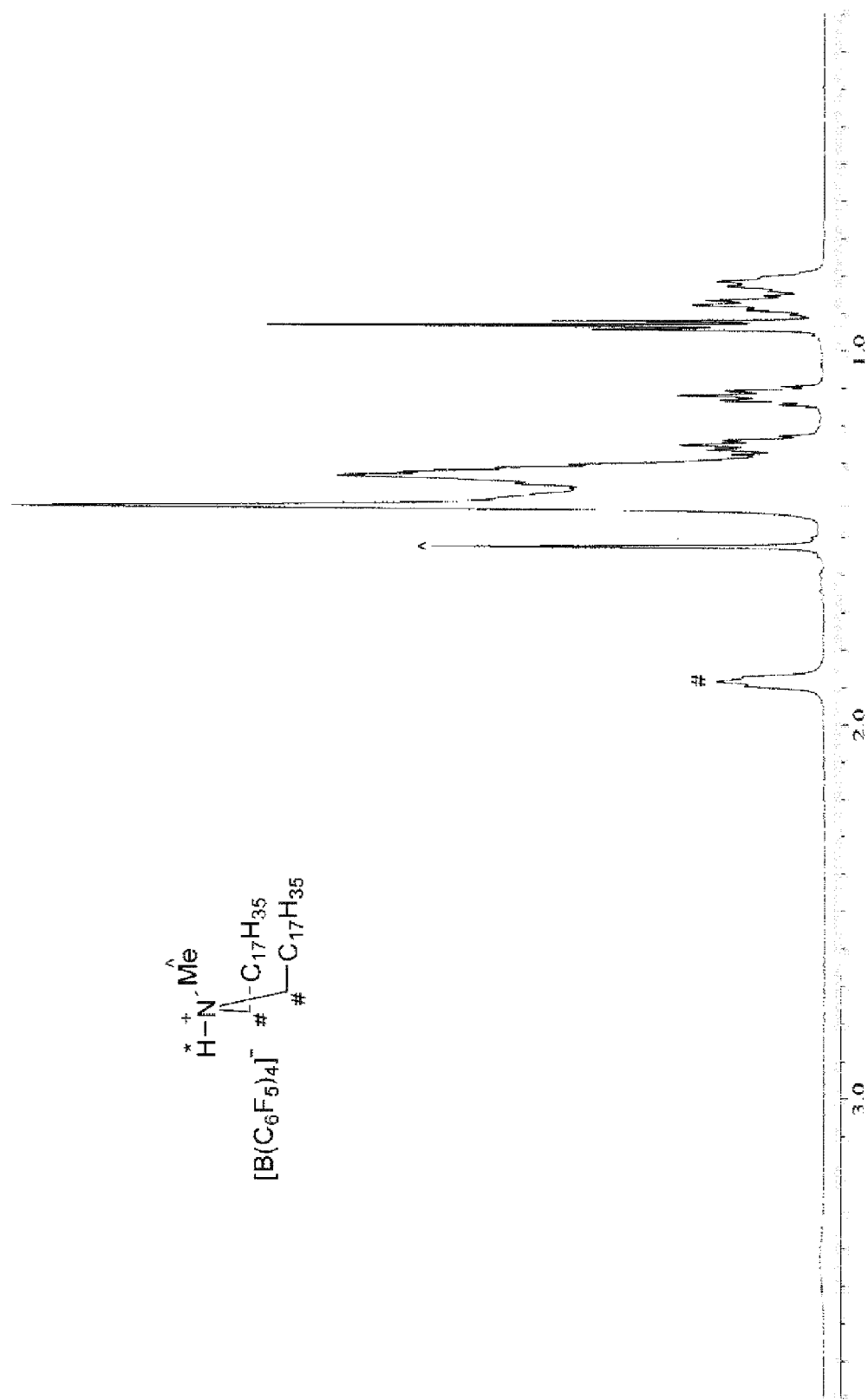
FIG. 2 shows a $^1$H NMR spectrum of $[(C_{18}H_{37})_2N(H)Me]^+[B(C_6F_5)_4]^-$ which is a cocatalyst prepared by the conventional preparation method.

On the contrary, in accordance with the $^1$H NMR spectrum of Preparation Example 1, containing water, the protons of NCH$_2$ were observed as a single wide signal of about 1.89 ppm (FIG. 2).

That is, it could be found that the anhydrous $[(C_{18}H_{37})_2N(H)Me]^+[B(C_6F_5)_4]^-$ cocatalyst prepared in the present invention is a compound with high purity without containing a trace amount of water that may be coordinated with an amine group, different from the cocatalyst prepared by the method of the related art.

Preparation of Olefin Polymer (1) Preparation of Catalyst Composition

Example 1

[Formula a]

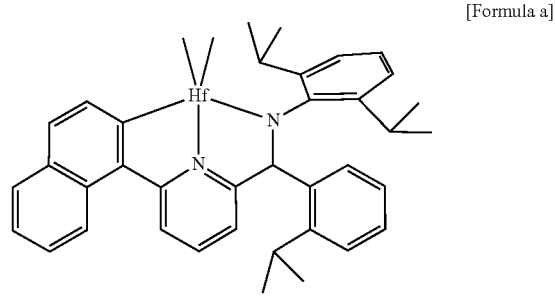

A catalyst composition was prepared by mixing the cocatalyst (2.5 µmol) of Preparation Example 1, a main catalyst (2.5 µmol) represented by Formula a, and methylcyclohexane (2.5 mL).

Examples 2 and 3, and Comparative Examples 1 to 3

Catalyst compositions were prepared by the same method as in Example 1 except for changing the injection conditions of cocatalysts and main catalysts as in Table 1.

TABLE 1

| | Cocatalyst type | Cocatalyst content (µmol) | Main catalyst type | Main catalyst (Hf) content (µmol) |
|---|---|---|---|---|
| Example 1 | Preparation Example 1 | 2.5 | Formula a | 2.5 |
| Example 2 | Preparation Example 1 | 1.5 | Formula a | 1.5 |
| Example 3 | Preparation Example 1 | 1 | Formula a | 1 |
| Comparative Example 1 | Comparative Preparation Example 1 | 10 | Formula a | 10 |
| Comparative Example 2 | Comparative Preparation Example 1 | 5 | Formula a | 5 |
| Comparative Example 3 | Comparative Preparation Example 1 | 2.5 | Formula a | 2.5 |

(2) Polymerization of Olefin Monomer 30 mL of hexane and 100 g of methylcyclohexane were injected to a high-pressure reactor of 90° C. Immediately after injecting the catalyst composition to the reactor, ethylene was injected with a pressure of 20 bars. Polymerization was performed at a temperature of 95° C. to 100° C. for 40 minutes, and the remaining gas was exhausted.

Experimental Example 1

Based on the results of the Examples and Comparative Examples, the characteristics of the catalysts were analyzed by the methods below.
(1) Catalyst Activity (ton/mol Hf/hr)
Based on the unit hour (hr), the catalyst activity was calculated as the ratio of the weight (ton) of the polymer produced per catalyst content (Hf mol) used.

TABLE 2

| | Catalyst activity (ton/Hf mol/hr) |
|---|---|
| Example 1 | 28 |
| Example 2 | 35 |
| Example 3 | 35 |
| Comparative Example 1 | 4.7 |
| Comparative Example 2 | 3 |
| Comparative Example 3 | No activity |

As shown in Table 2, it was confirmed that Examples 1 to 3 using the cocatalysts prepared according to the preparation method of the present invention showed higher catalyst activity during polymerizing olefin than Comparative Examples 1 to 3.

Particularly, it was confirmed that the cocatalyst of Preparation Example 1 showed high catalyst activity though used in a small amount of 1 µmol as in Example 3, but the catalyst activity was markedly degraded in the Comparative Examples using the cocatalyst of Comparative Preparation Example 1, and particularly in Comparative Example 3, the catalyst was deactivated due to the moisture contained in the cocatalyst of Comparative Preparation Example 1, and the catalyst activity was not shown at all.

(2) Catalyst Activity Change According to the Lapse of Time (Catalyst Stability)

To evaluate the stability of a catalyst solution, catalyst compositions of the Examples and Comparative Examples were prepared, stood for a certain time as in Table 3 below, and used for the preparation of an olefin polymer. Each catalyst activity was evaluated and shown in Table 4.

TABLE 3

| | Time for standing |
|---|---|
| Example 1 | 1 day |
| Example 2 | 3 days |
| Example 3 | 7 days |
| Comparative Example 1 | 6 hours |
| Comparative Example 2 | 12 hours |
| Comparative Example 3 | 1 day |

TABLE 4

| | Catalyst activity immediately after preparation (ton/Hf mol/hr) | Catalyst activity after the lapse of time (ton/Hf mol/hr) |
|---|---|---|
| Example 1 | 28 | 25 |
| Example 2 | 35 | 31 |
| Example 3 | 35 | 30 |
| Comparative Example 1 | 4.7 | 2.5 |
| Comparative Example 2 | 3 | 1 |
| Comparative Example 3 | No activity | No activity |

As in Table 4, the catalyst stability of the Examples using the cocatalyst of Preparation Example 1 was excellent, and the activity of the main catalyst was maintained almost as it was after the lapse of a certain time, but the catalyst stability of the Comparative Examples using the cocatalyst of Comparative Preparation Example 1 was low, and it was found that the catalyst activity was rapidly decreased according to the lapse of time.

That is, it was confirmed that if the cocatalyst prepared according to the preparation method of the present invention was used, the initial catalyst activity of the main catalyst compound was shown high, the catalyst stability was also excellent, and the high catalyst activity was maintained after the lapse of time.

The invention claimed is:
1. A method for preparing a compound represented by $[(C_{18}H_{37})_2N(H)Me]^+[B(C_6F_5)_4]^-$, the method consisting of:
   a step of reacting $[K]^+[B(C_6F_5)_4]^-$ and $[(C_{18}H_{37})_2N(H)Me]^+[Cl]^-$ in the presence of the anhydrous hydrocarbon solvent and in absence of water under an inert atmosphere using a standard glove box and Schlenk technique at a temperature of 0 to 50° C. for 15 minutes to 5 hours to obtain a mixture, and
   a step of separating and purifying the compound represented by $[(C_{18}H_{37})_2N(H)Me]^+[B(C_6F_5)_4]^-$ from the mixture, wherein the compound represented by $[(C_{18}H_{37})_2N(H)Me]^+[B(C_6F_5)_4]^-$ shows at least two peaks in a range of 1.60 ppm to 2.10 ppm in a $^1H$ NMR (500 MHz, $C_6D_6$, and standard material TMS) spectrum.

2. The method for preparing a compound represented by $[(C_{18}H_{37})_2N(H)Me]^+[B(C_6F_5)_4]^-$ according to claim 1, wherein the compound represented by $[(C_{18}H_{37})_2N(H)Me]^+[B(C_6F_5)_4]^-$ shows at least one peak in each of a range of 1.75 ppm to 1.90 ppm and in a range of 1.90 ppm to 2.00 ppm, in a $^1H$ NMR (500 MHz, $C_6D_6$, and standard material TMS) spectrum.

3. The method for preparing a compound represented by $[(C_{18}H_{37})_2N(H)Me]^+[B(C_6F_5)_4]^-$ according to claim 1, wherein protons attached to α-carbon of nitrogen, sulfur or phosphorous included in L show different peaks in a $^1H$ NMR (500 MHz, $C_6D_6$, and standard material TMS) spectrum of the compound represented by $[(C_{18}H_{37})_2N(H)Me]^+[B(C_6F_5)_4]$.

4. The method for preparing a compound represented by $[(C_{18}H_{37})_2N(H)Me]^+[B(C_6F_5)_4]^-$ according to claim 1, wherein the anhydrous hydrocarbon solvent is one or more selected from the group consisting of pentane, neopentane, hexane, cyclohexane, methylcyclohexane, heptane, octane, benzene, toluene, xylene and ethylbenzene.

5. The method for preparing a compound represented by $[(C_{18}H_{37})_2N(H)Me]^+[B(C_6F_5)_4]^-$ according to claim 1, wherein a molar ratio of the compound represented by $[K]^+[B(C_6F_5)_4]^-$ and the compound represented by $[(C_{18}H_{37})_2N(H)Me]^+[Cl]^-$ in the reaction is 1:1 to 5:1.

* * * * *